US011438071B2

United States Patent
Ono et al.

(10) Patent No.: US 11,438,071 B2
(45) Date of Patent: Sep. 6, 2022

(54) OPTICAL REPEATER

(71) Applicant: Nippon Telegraph and Telephone Corporation, Tokyo (JP)

(72) Inventors: Hirotaka Ono, Musashino (JP); Koki Shibahara, Musashino (JP); Takayuki Mizuno, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/311,082

(22) PCT Filed: Dec. 3, 2019

(86) PCT No.: PCT/JP2019/047284
§ 371 (c)(1),
(2) Date: Jun. 4, 2021

(87) PCT Pub. No.: WO2020/129627
PCT Pub. Date: Jun. 25, 2020

(65) Prior Publication Data
US 2022/0045759 A1 Feb. 10, 2022

(30) Foreign Application Priority Data
Dec. 17, 2018 (JP) .............................. JP2018-235680

(51) Int. Cl.
*H04B 10/291* (2013.01)
*H04B 10/2581* (2013.01)
*H04J 14/04* (2006.01)

(52) U.S. Cl.
CPC ....... *H04B 10/291* (2013.01); *H04B 10/2581* (2013.01); *H04J 14/04* (2013.01)

(58) Field of Classification Search
CPC .... H04B 10/291; H04B 10/2581; H04J 14/04
(Continued)

(56) References Cited

U.S. PATENT DOCUMENTS 6,418,256 B1 * 7/2002 Danziger ........... G02B 6/03611
385/123
6,539,148 B1 * 3/2003 Kim ...................... G02F 1/0134
398/43

(Continued)

FOREIGN PATENT DOCUMENTS

JP 2017-191185 A 10/2017
JP 2018-6474 A 1/2018

OTHER PUBLICATIONS

K. Shibahara et al., *DMD-Unmanaged Long-Haul SDM Transmission Over 2500-km 12-core×3-mode MC-FMF and 6300-km 3-mode FMF Employing Intermodal Interference Cancelling Technique*, Proc. OFC 2018, Post deadline Paper, Th4C.6, Mar. 11, 2018, pp. 1-3.

*Primary Examiner* — Abbas H Alagheband
(74) *Attorney, Agent, or Firm* — Workman Nydegger (57) ABSTRACT

An optical repeater in a mode-division-multiplexing (MDM) optical transmission system prevents a signal-to-noise ratio (SNR) from deteriorating due to a loss of a mode demultiplexer. The optical repeater in the MDM optical transmission system is configured to include at least one multimode optical amplifier, a mode demultiplexer, a mode multiplexer, and variable optical attenuators. One of the multimode optical amplifiers is disposed on the input side of the mode demultiplexer.

5 Claims, 7 Drawing Sheets (58) Field of Classification Search
USPC .......................................................... 398/44
See application file for complete search history.

(56) References Cited

U.S. PATENT DOCUMENTS

| | | | | |
|---|---|---|---|---|
| 7,184,623 | B2* | 2/2007 | Cai | G02B 6/2552 |
| | | | | 359/333 |
| 10,969,540 | B2* | 4/2021 | Chen | G02B 6/268 |
| 11,156,767 | B2* | 10/2021 | Urushibara | G02B 6/02019 |
| 2006/0051017 | A1* | 3/2006 | Hallemeier | H04J 14/04 |
| | | | | 385/28 |
| 2013/0064554 | A1* | 3/2013 | Li | G02B 6/02009 |
| | | | | 398/143 |
| 2013/0084077 | A1* | 4/2013 | Mukasa | G02B 6/02333 |
| | | | | 398/142 |
| 2014/0063592 | A1* | 3/2014 | Ip | H04B 10/293 |
| | | | | 359/337.1 |
| 2014/0186040 | A1* | 7/2014 | Fujiwara | G02B 6/2808 |
| | | | | 398/66 |
| 2015/0086157 | A1* | 3/2015 | Fontaine | H04J 14/04 |
| | | | | 385/28 |
| 2017/0264365 | A1* | 9/2017 | Takahashi | H04B 10/548 |
| 2017/0299812 | A1* | 10/2017 | Zhao | G02B 6/124 |

* cited by examiner

Fig. 5

OPTICAL REPEATER

TECHNICAL FIELD

The present invention relates to an optical repeater used in an optical communication system that transmits optical signals.

BACKGROUND ART

With the increase in speed and capacity of communication service, traffic transmitted by a trunk line optical transmission system has been explosively increasing. In view of this, technical studies have been made for drastically increasing the transmission capacity of an optical transmission system. In particular, recent years have seen a rapid advancement in studies on a mode-division-multiplexing (MDM) optical transmission technique in which different signals are superimposed to be transmitted on a plurality of different optical propagation modes of an optical fiber, and in a long-haul MDM optical transmission system, optical relay transmission using optical amplifiers need to be performed.

Figure 1:
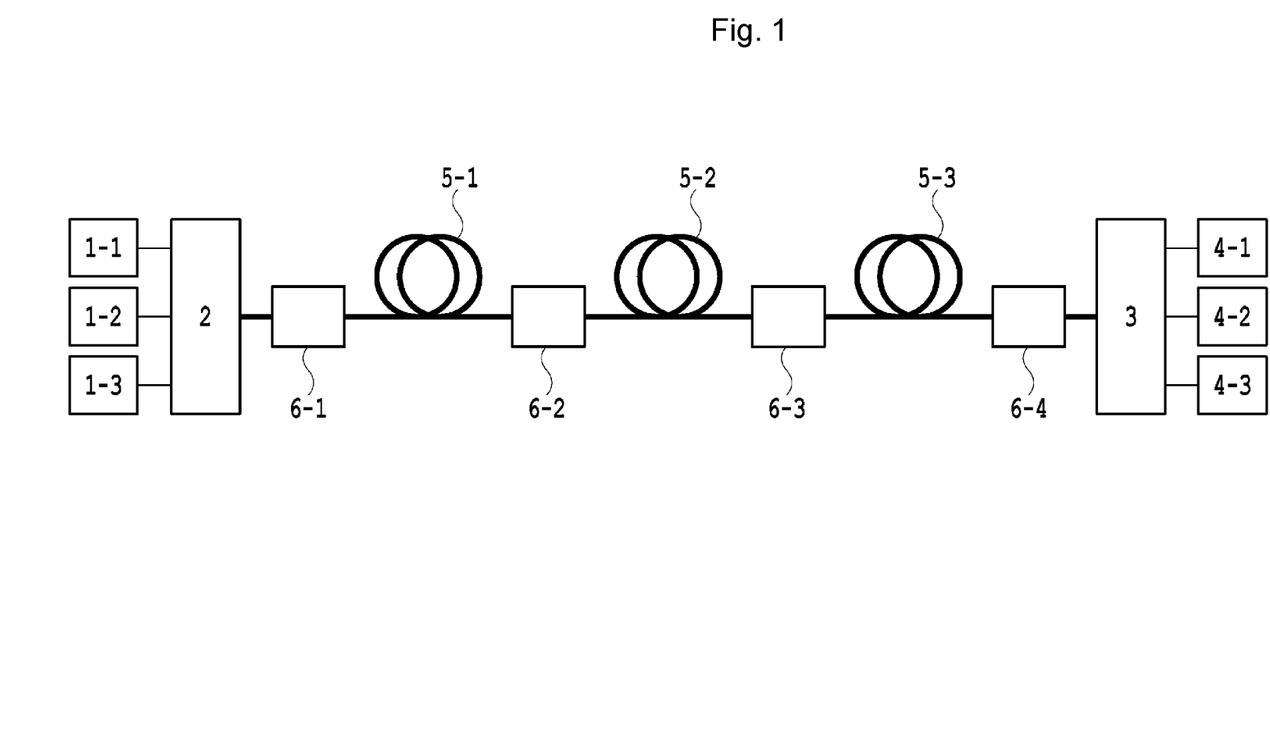
FIG. 1 schematically illustrates a conventional long-haul MDM optical transmission system.

FIG. 1 schematically illustrates a conventional long-haul MDM optical transmission system. FIG. 1 illustrates optical transmission apparatuses 1-1 to 1-3 each of which generates single-wavelength or wavelength-multiplexed signal lights. Each of the optical transmission apparatuses 1-1 to 1-3 includes a light source, optical modulation means, and if being a transmission apparatus for wavelength-multiplexed signals, a wavelength multiplexer.

Transmission lights from the optical transmission apparatuses 1-1 to 1-3 are mode-multiplexed into a multimode light in a mode multiplexer 2, and the multimode light is multistage-relayed via multistage relay sections (spans) that include multimode optical fibers 5-1 to 5-3 for transmission and optical relay apparatuses 6-1 to 6-4 disposed alternately.

The multimode light that has reached a mode demultiplexer 3 is mode-demultiplexed, and the mode-demultiplexed signal lights are received by respective optical reception apparatuses 4-1 to 4-3. The optical reception apparatuses 4-1 to 4-3 each receive single-wavelength or wavelength-multiplexed signal lights and include photoelectric conversion means, electrical signal processing means, a wavelength demultiplexer if being a reception apparatus for wavelength-multiplexed signals, and also an optical circuit (for example, an optical delay circuit) needed for receiving the signal lights.

The MDM optical transmission has a problem in that differential mode delay (DMD) and differential modal loss (DML) that occur in the multimode optical fiber for transmission are accumulated along with increased transmission distance and deteriorate the reception property. In particular, this problem becomes remarkable in a case of a long-haul MDM optical transmission system using the optical relay. To solve the problem of the property deterioration due to DMD and DML, there has been proposed a scheme called cyclic-mode-permutated (CMP) transmission in which transmission is performed while an optical propagation mode is permutated at optical relay points, and it has been demonstrated in a long-haul MDM optical transmission experiment that the deterioration of DMD and DML is reduced by using this scheme (NPL 1).

CITATION LIST

Non Patent Literature

[NPL 1] K. Shibahara et al., "DMD-Unmanaged Long-Haul SDM Transmission over 2500-km 12-core×3-mode MC-FMF and 6300-km 3-mode FMF Employing Intermodal Interference Cancelling Technique", in Proc. OFC2018, Post deadline Paper, Th4C.6.

SUMMARY OF THE INVENTION

Technical Problem

Figure 2:
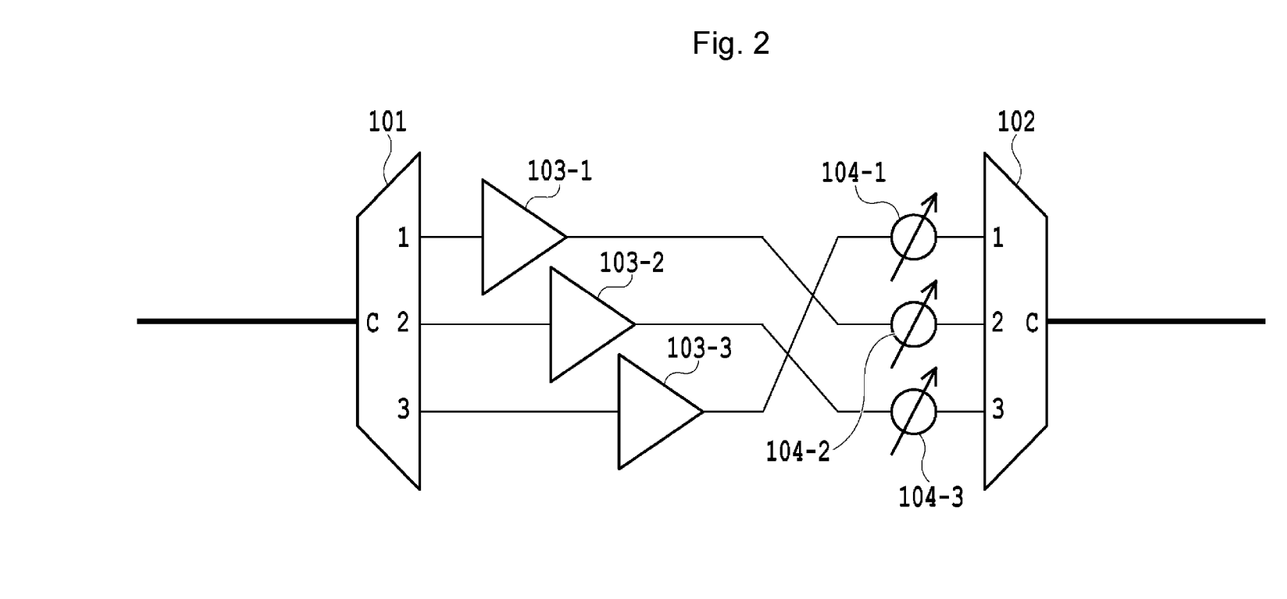
FIG. 2 illustrates a configuration of an optical repeater using a cyclic mode permutation (CMP) transmission scheme in a conventional MDM optical transmission system.

FIG. 2 illustrates an optical repeater using a cyclic mode permutation (CMP) scheme in a conventional long-haul MDM transmission system. FIG. 2 illustrates a mode demultiplexer 101, a mode multiplexer 102, single-mode optical amplifiers 103-1 to 103-3, variable optical attenuators 104-1 to 104-3. A multimode fiber is connected to a port C of each of the mode demultiplexer 101 and the mode multiplexer 102, and single-mode fibers are connected between ports 1 to 3 of the mode demultiplexer 101 and ports 1 to 3 of the mode multiplexer 102.

A multimode signal light in which three different modes $LP_{01}$, $LP_{11e}$, and $LP_{11o}$, are multiplexed is input from the port C of the mode demultiplexer 101. The modes are converted into their respective fundamental modes, and the signal lights of the converted modes are output from their respective ports 1 to 3. Namely, the $LP_{01}$-mode signal light is output from the port 1 of the mode demultiplexer 101 (since the $LP_{01}$ mode is a fundamental mode, no mode conversion is actually performed on this mode), the $LP_{11e}$-mode signal light is output from the port 2, and the $LP_{11o}$-mode signal light is output from the port 3.

The signal lights output from the three ports of the mode demultiplexer 101 are amplified by the respective single-mode optical amplifiers 103-1 to 103-3. Next, the power of the signal lights output from the optical amplifiers is adjusted to be equalized by the respective variable optical attenuators 104-1 to 104-3, and the power-adjusted signal lights are input to the respective ports 1 to 3 of the mode multiplexer 102.

The mode multiplexer 102 performs an operation opposite to that performed by the mode demultiplexer 101. Namely, the signal light input to the port 1 of the mode multiplexer 102 is converted into the $LP_{01}$ mode (since the $LP_{01}$ mode is a fundamental mode, no mode conversion is actually performed on this mode), the signal light input to the port 2 is converted into the $LP_{11e}$ mode, the signal light input to the port 3 is converted into the $LP_{11o}$ mode, and a signal light in which these three different modes are multiplexed is output from the port C of the mode multiplexer 102.

As illustrated in FIG. 2, the output port of the mode demultiplexer 101 is connected to one of the input ports of the mode multiplexer 102 by shifting to the input port corresponding to a different mode from that of the output port. Namely, the port 1 of 101 is connected to the port 2 of 102, the port 2 of the mode demultiplexer 101 is connected to the port 3 of the mode multiplexer 102, and the port 3 of the mode demultiplexer 101 is connected to the port 1 of the mode multiplexer 102.

When the multimode light is relayed over a plurality of spans as illustrated in FIG. 1, by connecting the repeaters in such a manner that the modes are permutated at the next span, each transmission light is sequentially transmitted in a different mode at each span so that the accumulated DMD and DML can be equalized among the different modes. Thus, the transmission property is improved.

However, the conventional optical repeater illustrated in FIG. 2 has a significant problem in that a signal to noise ratio (SNR) is deteriorated due to a loss of the mode demultiplexer 101. With the optical repeater illustrated in FIG. 2, since the signal light received by the mode demultiplexer 101 is a low-strength signal at the end of a span, the loss of the mode demultiplexer 101 has a significant impact on the decrease in SNR. This is a common problem for any optical repeater in the MDM optical transmission system that has a mode demultiplexer, even for the optical repeater not using the CMP scheme.

The present invention has been made in view of the above problem, and it is an object of the present invention to provide an optical repeater in the MDM optical transmission system that is capable of preventing the signal to noise ratio (SNR) from deteriorating due to the loss of the mode demultiplexer.

Means for Solving the Problem

The optical repeater according to the present invention includes a mode demultiplexer, a mode multiplexer, variable optical attenuators, and at least one multimode optical amplifier. A main feature of the present invention is to dispose one of the multimode optical amplifiers on the input side of the mode demultiplexer.

The present invention includes the following configurations to achieve the above object.

Configuration 1

An optical repeater in an MDM optical transmission system that includes a mode demultiplexer connected to an incoming multimode optical fiber, a plurality of single-mode fibers connected to the mode demultiplexer, variable optical attenuators connected to the plurality of respective single-mode fibers, a mode multiplexer connected to the plurality of single-mode fibers that pass through the respective variable optical attenuators, and an outgoing multimode optical fiber connected to the mode multiplexer, the optical repeater including at least one multimode optical amplifier, wherein one of the multimode optical amplifiers is disposed on an input side of the mode demultiplexer.

Configuration 2

The optical repeater according to configuration 1, including a multicore optical amplifier that amplifies a fundamental mode signal light between the mode demultiplexer and the mode multiplexer.

Configuration 3

The optical repeater according to configuration 1, including, between the mode demultiplexer and the mode multiplexer, a same number of single-core optical amplifiers that amplify fundamental mode signal lights as a number of modes of the signal light amplified by the multimode optical amplifier.

Configuration 4

The optical repeater according to configuration 1, wherein the multimode optical amplifier includes a wavelength-equalizing filter that offsets wavelength dependence of gains.

Effects of the Invention

As described above, according to the present invention, the optical repeater in the MDM optical transmission system uses at least one multimode optical amplifier, and since one of the multimode optical amplifiers is disposed on the input side of the mode demultiplexer, the optical repeater can prevent the signal to noise ratio (SNR) from deteriorating due to the loss of the mode demultiplexer.

DESCRIPTION OF EMBODIMENTS

Hereinafter, embodiments of the present invention will be described in detail with reference to the drawings.

First Embodiment

Figure 3:
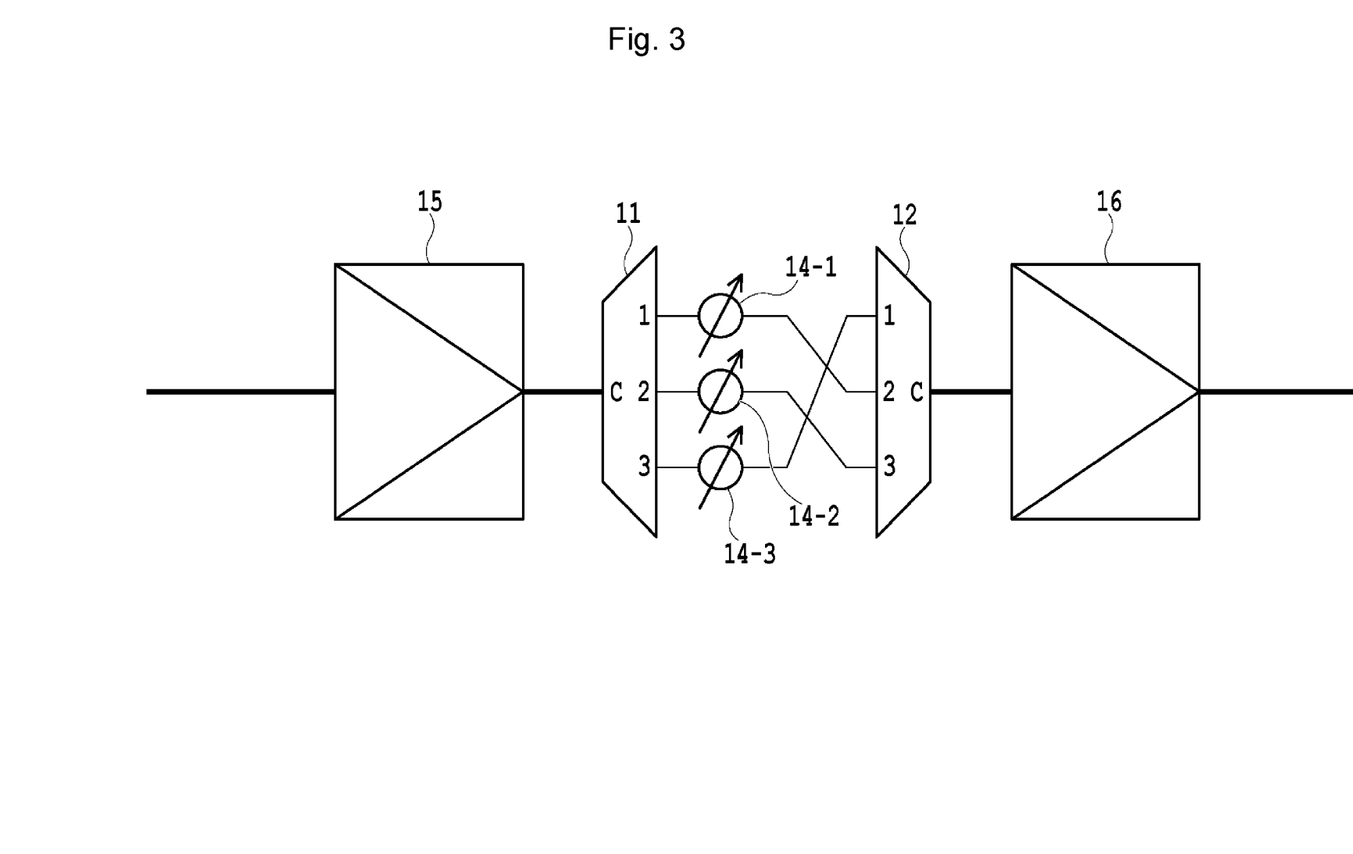
FIG. 3 illustrates a configuration of an optical repeater according to a first embodiment of the present invention.

FIG. 3 illustrates a configuration of an optical repeater according to a first embodiment of the present invention. FIG. 3 illustrates a mode demultiplexer 11, a mode multiplexer 12, and variable optical attenuators 14-1 to 14-3. Two multimode optical amplifiers 15 and 16 can amplify a multimode signal light, which is demultiplexed and multiplexed by the mode demultiplexer 11 and the mode multiplexer 12, while keeping its multimode. The multimode optical amplifier 15 is disposed on the input side of the mode demultiplexer 11. The multimode optical amplifier 16 is disposed on the output side of the mode multiplexer 12.

The mode demultiplexer 11 and the mode multiplexer 12 perform the same operations as those performed by the conventional optical repeater illustrated in FIG. 2. The mode demultiplexer 11 and the mode multiplexer 12 are connected to each other by using the cyclic mode permutation (CMP) scheme, which is the same scheme as in the conventional example in FIG. 2, except for the absence of the single-mode optical amplifier. However, the CMP scheme does not necessarily need to be used.

In addition, both or either one of the multimode optical amplifiers 15 and 16 may include a wavelength-equalizing filter (not illustrated) to offset the wavelength dependence of the sum of gains (in dB) obtained by the multimode optical amplifiers 15 and 16.

The variable optical attenuators 14-1 to 14-3 adjust the difference in signal light power among the different modes and equalize the levels of the signal light power of the respective modes. With the wavelength equalizing filter and the attenuation adjustment by the variable optical attenuators 14-1 to 14-3, the wavelength characteristics of the signal lights of all the modes are equalized, and the light power difference among the modes can be reduced. Furthermore, in addition to equalizing the signal light power among the modes, the variable optical attenuators 14-1 to 14-3 compensate a change in span loss generated when, for example, the transmission fiber is bent so that the signal light power can be maintained temporally stable.

Figure 4:
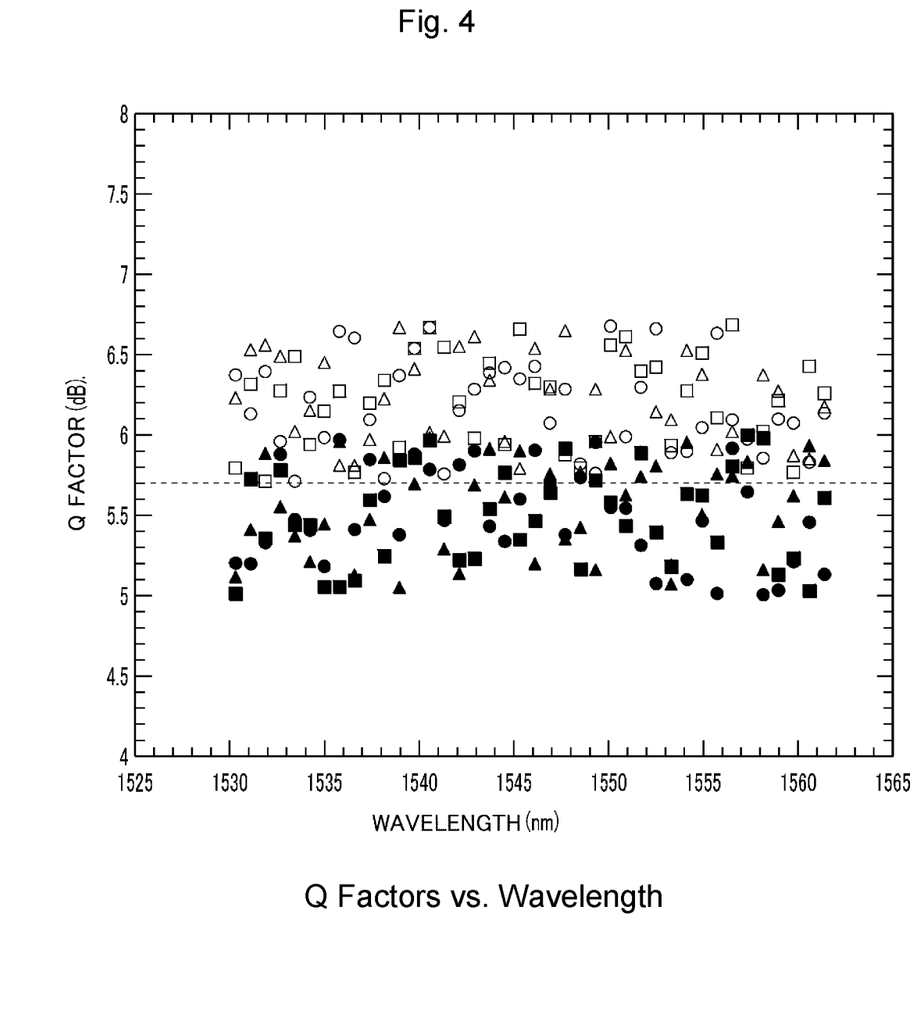
FIG. 4 illustrates a transmission property of an MDM optical transmission system that uses the optical repeater according to the first embodiment of the present invention.

FIG. 4 illustrates a transmission property of an MDM optical transmission system using the optical repeater according to the first embodiment of the present invention.

FIG. 4 illustrates Q factors (Q factors in the preceding stage of a forward error correction circuit in the reception apparatus) obtained when a 3-mode ($LP_{01}$ mode, $LP_{11e}$ mode, $LP_{11o}$ mode) 40-wavelength-multiplexed signal modulated at 20 Gbaud 16 quadrature amplitude modulation (QAM) is transmitted over 18 spans with 80 km per span.

In FIG. 4, white circles, white squares, and white triangles represent Q factors obtained when the optical repeater transmits signal lights of the $LP_{01}$ mode, the $LP_{11e}$ mode, and the $LP_{11o}$ mode, respectively. In FIG. 4, Q factors obtained when the conventional optical repeater is used in the same MDM optical transmission system are also indicated by black circles, black squares, and black triangles (representing the $LP_{01}$ mode, the $LP_{11e}$ mode, and the $LP_{11o}$ mode, respectively).

A dashed line at 5.7 dB in FIG. 4 indicates that, when the Q factor is equal to 5.7 dB or more, transmission is performed without an error and that, when the Q factor is less than 5.7 dB, deterioration of the transmission quality is so large that transmission cannot be properly performed. As is apparent from FIG. 4, when the transmission is performed by using the conventional optical repeater, the Q factors for some signal light wavelengths are below 5.7 dB, whereas, when the transmission is performed by using the optical repeater according to the present embodiment, the Q factors for all the signal light wavelengths are 5.7 dB or more. This indicates that the transmission quality is improved and thus demonstrates the advantageous effects of the present invention.

Second Embodiment

Figure 5:
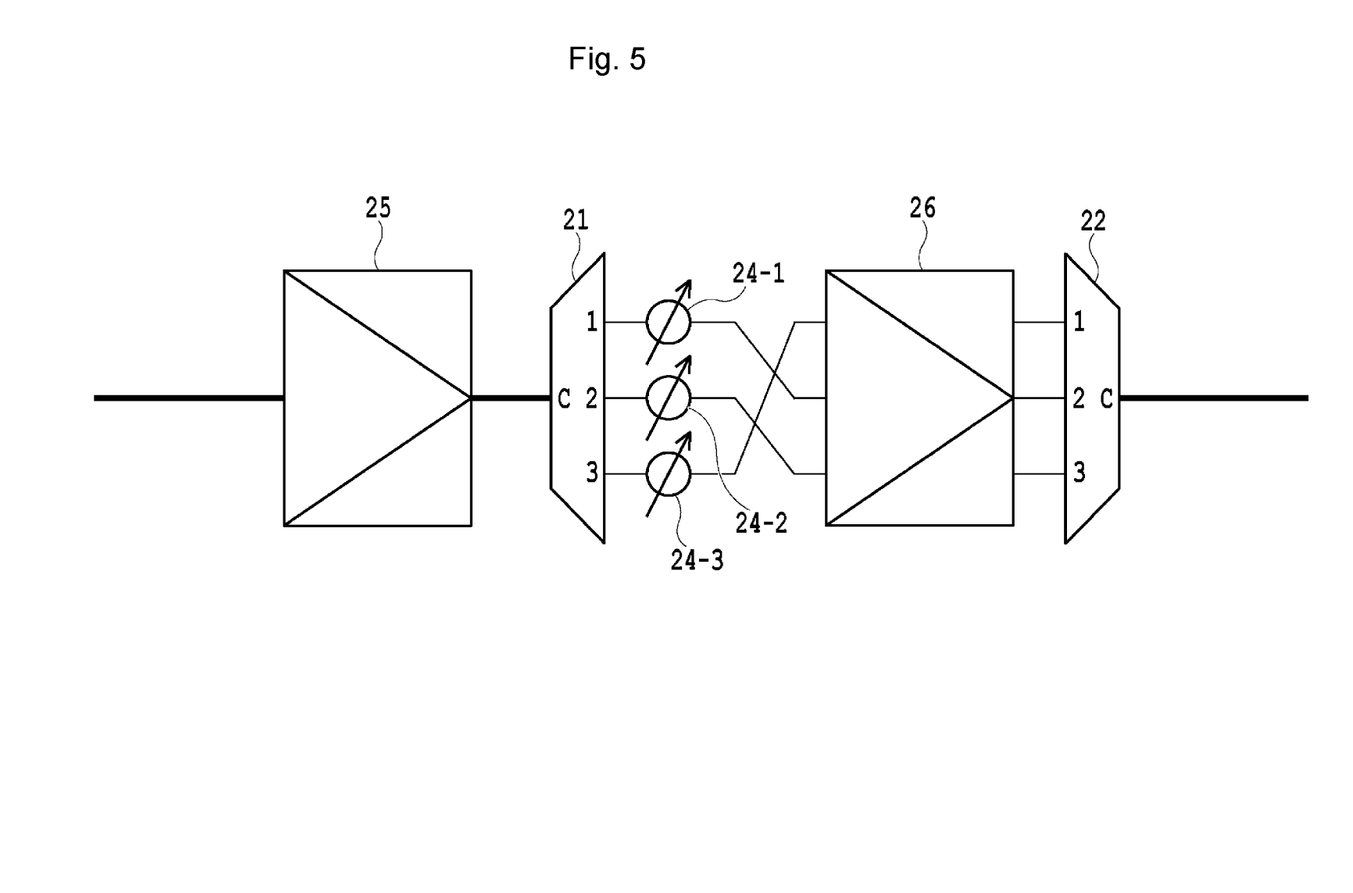
FIG. 5 illustrates a configuration of an optical repeater according to a second embodiment of the present invention.

FIG. 5 illustrates a configuration of an optical repeater according to a second embodiment of the present invention. FIG. 5 illustrates a mode demultiplexer 21, a mode multiplexer 22, and variable optical attenuators 24-1 to 24-3. As with the multimode optical amplifier 15 in the first embodiment (FIG. 3), a multimode optical amplifier 25 is disposed on the input side of the mode demultiplexer 21 and can amplify a multimode signal light, which is to be demultiplexed by the mode demultiplexer 21, while keeping its multimode.

In contrast, in the optical repeater according to the second embodiment illustrated in FIG. 5, unlike the first embodiment (FIG. 3), an optical amplifier disposed on the output side is not a multimode optical amplifier but a multicore optical amplifier 26 which includes a plurality of cores for single-mode amplification in a single fiber. The multicore optical amplifier 26 disposed at the preceding stage of the mode multiplexer 22 amplifies the signal lights, which are demultiplexed and converted into their respective fundamental modes by the mode demultiplexer 21 and whose power is adjusted by the variable optical attenuators 24-1 to 24-3, at the respective cores and outputs the amplified signal lights to the ports 1 to 3 of the mode multiplexer 22.

The mode demultiplexer 21 and the mode multiplexer 22 in FIG. 5 perform the same operations as those performed by the conventional optical repeater (FIG. 2) and the optical repeater according to the first embodiment (FIG. 3) described above. The mode demultiplexer 11 and the mode multiplexer 12 are connected to each other by using the cyclic mode permutation (CMP) scheme, which is the same scheme as in the conventional example in FIG. 2, except for the absence of the single-mode optical amplifier. However, the CMP scheme does not necessarily need to be used.

Both or either one of the multimode optical amplifier 25 and the multicore optical amplifier 26 includes a wavelength-equalizing filter (not illustrated) to offset the wavelength dependence of the sum of gains (in dB) obtained by the multimode optical amplifier 25 and the multicore optical amplifier 26.

The variable optical attenuators 24-1 to 24-3 in FIG. 5 adjust the difference in signal light power among the different modes and equalize the levels of the signal light power of the respective modes. With the wavelength equalizing filter and the attenuation adjustment by the variable optical attenuators, the wavelength characteristics of the signal lights in all the modes are equalized, and the light power difference among the modes can be reduced. Furthermore, in addition to equalizing the signal light power among the modes, the variable optical attenuators 24-1 to 24-3 compensate a change and variation in span loss generated when, for example, the transmission fiber is bent so that the signal light power can be maintained temporally stable.

Figure 6:
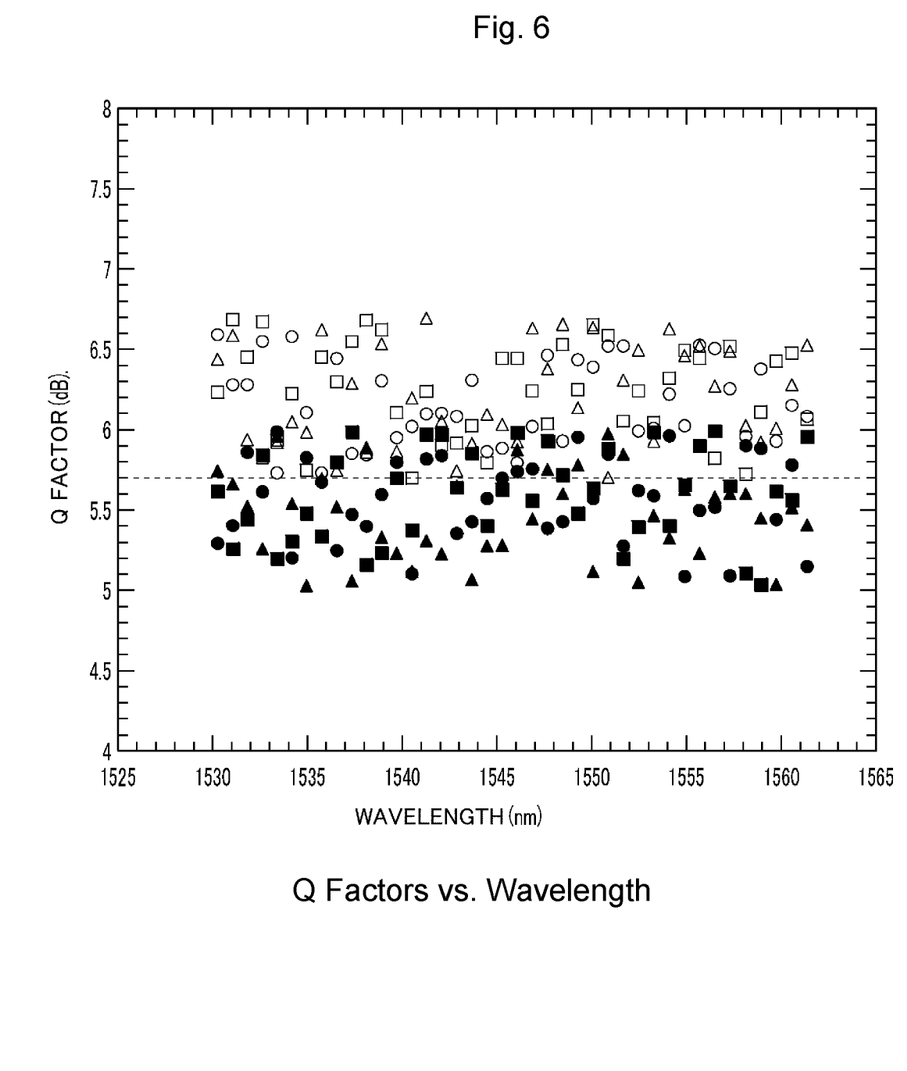
FIG. 6 illustrates a transmission property of an MDM optical transmission system that uses the optical repeater according to the second embodiment of the present invention.

FIG. 6 illustrates a transmission property of an MDM optical transmission system using the optical repeater according to the second embodiment of the present invention. FIG. 6 illustrates Q factors (Q factors in the preceding stage of a forward error correction circuit in the reception apparatus) obtained when a 3-mode ($LP_{01}$ mode, $LP_{11e}$ mode, $LP_{11o}$ mode) 40-wavelength-multiplexed signal modulated at 20 Gbaud 16 quadrature amplitude modulation (QAM) is transmitted over 18 spans with 80 km per span.

In FIG. 6, white circles, white squares, and white triangles represent Q factors obtained when the optical repeater transmits signal lights of the $LP_{01}$ mode, the $LP_{11e}$ mode, and the $LP_{11o}$ mode, respectively. In FIG. 6, Q factors obtained when the conventional optical repeater is used in the same MDM optical transmission system are also indicated by black circles, black squares, and black triangles (representing the $LP_{01}$ mode, the $LP_{11e}$ mode, and the $LP_{11o}$ mode, respectively).

A dashed line at 5.7 dB in FIG. 6 indicates that, when the Q factor is equal to 5.7 dB or more, transmission is performed without an error and that, when the Q factor is less than 5.7 dB, deterioration of the transmission quality is so large that transmission cannot be properly performed. As is apparent from FIG. 6, when the transmission is performed by using the conventional optical repeater, the Q factors for some signal light wavelengths are below 5.7 dB, whereas, when the transmission is performed by using the optical repeater according to the present embodiment, the Q factors for all the signal light wavelengths are 5.7 dB or more. This indicates that the transmission quality is improved and thus demonstrates the advantageous effects of the present invention.

Variation of Second Embodiment

Figure 7:
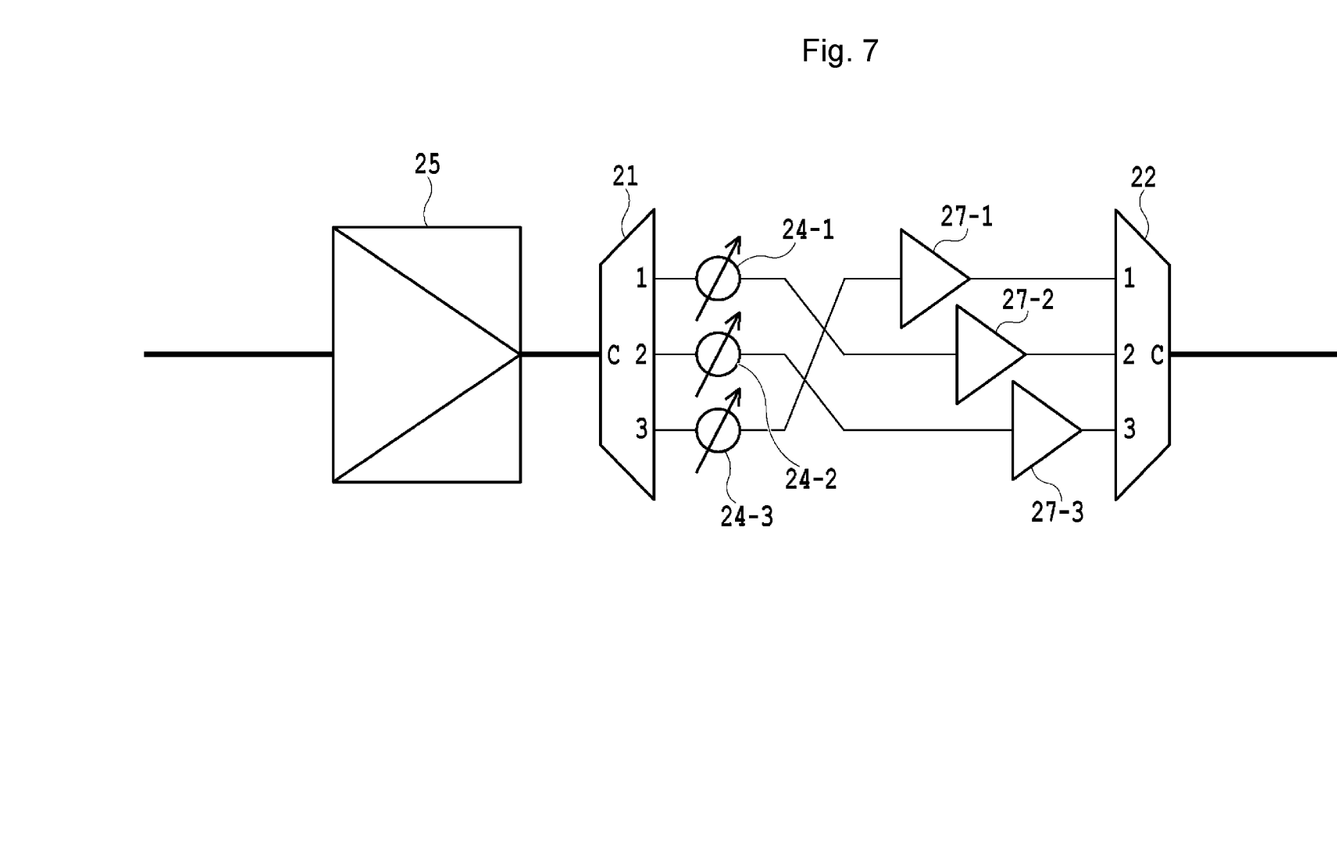
FIG. 7 illustrates a configuration of a variation of the optical repeater according to the second embodiment of the present invention.

FIG. 7 illustrates a configuration of a variation of the second embodiment of the present invention. In this variation, the same advantageous effects as those of the second embodiment illustrated in FIG. 5 can be achieved by replacing the multicore optical amplifier 26 used in the second embodiment illustrated in FIG. 5 with single-core optical amplifiers (which amplify only the fundamental mode) 27-1 to 27-3 provided as many as the number of cores.

INDUSTRIAL APPLICABILITY

As described above, according to the present invention, the optical repeater in the MDM optical transmission system uses at least one multimode optical amplifier, and by disposing all or a part of the multimode optical amplifiers on the input side of the mode demultiplexer, the optical repeater that is capable of preventing the signal to noise ratio (SNR) from deteriorating due to the loss of the mode demultiplexer can be realized.

REFERENCE SIGNS LIST 1-1 to 1-3 Optical transmission apparatus
2, 102, 12, 22 Mode multiplexer
5-1 to 5-3 Multimode fiber
6-1 to 6-4 Optical repeater
3, 101, 11, 21 Mode demultiplexer
4-1 to 4-3 Optical Reception apparatus
103-1 to 103-3 Single-mode optical amplifier
104-1 to 104-3, 14-1 to 14-3, 24-1 to 24-3 Variable optical attenuator
15, 16, 25 Multimode optical amplifier
26 Multicore optical amplifier
27-1 to 27-3 Single-core optical amplifier

The invention claimed is:

1. An optical repeater in a mode-division-multiplexing (MDM) optical transmission system comprising:
a mode demultiplexer connected to an incoming multimode optical fiber,
a plurality of single-mode fibers connected to the mode demultiplexer,
variable optical attenuators connected to the plurality of respective single-mode fibers,
a mode multiplexer connected to the plurality of single-mode fibers that pass through the respective variable optical attenuators, and
an outgoing multimode optical fiber connected to the mode multiplexer,
the optical repeater comprising at least one multimode optical amplifier, wherein one of the at least one multimode optical amplifier is disposed on an input side of the mode demultiplexer, and
wherein between the mode demultiplexer and the mode multiplexer, a same number of single-core optical amplifiers are disposed that amplify fundamental mode signal lights as a number of modes of the signal light amplified by the multimode optical amplifier.

2. The optical repeater according to claim 1, comprising a multicore optical amplifier that amplifies a fundamental mode signal light between the mode demultiplexer and the mode multiplexer.

3. The optical repeater according to claim 1, wherein the multimode optical amplifier includes a wavelength-equalizing filter that offsets wavelength dependence of gains.

4. An optical repeater in a mode-division-multiplexing (MDM) optical transmission system comprising:
a mode demultiplexer connected to an incoming multimode optical fiber,
a first multimode optical amplifier disposed on an input side of the mode demultiplexer,
a plurality of single-mode fibers connected to the mode demultiplexer,
variable optical attenuators connected to the plurality of respective single-mode fibers,
a mode multiplexer connected to the plurality of single-mode fibers that pass through the respective variable optical attenuators,
an outgoing multimode optical fiber connected to the mode multiplexer, and
a second multimode optical amplifier disposed on an output side of the mode multiplexer.

5. An optical repeater in a mode-division-multiplexing (MDM) optical transmission system comprising:
a mode demultiplexer connected to an incoming multimode optical fiber,
a first multimode optical amplifier disposed on an input side of the mode demultiplexer,
a plurality of single-mode fibers connected to the mode demultiplexer,
variable optical attenuators connected to the plurality of respective single-mode fibers,
a second multimode optical amplifier connected to the plurality of single-mode fibers that pass through the respective variable optical attenuators,
a mode multiplexer connected to the plurality of single-mode fibers that pass through the second multimode optical amplifier, and
an outgoing multimode optical fiber connected to the mode multiplexer.

* * * * *